United States Patent Office.

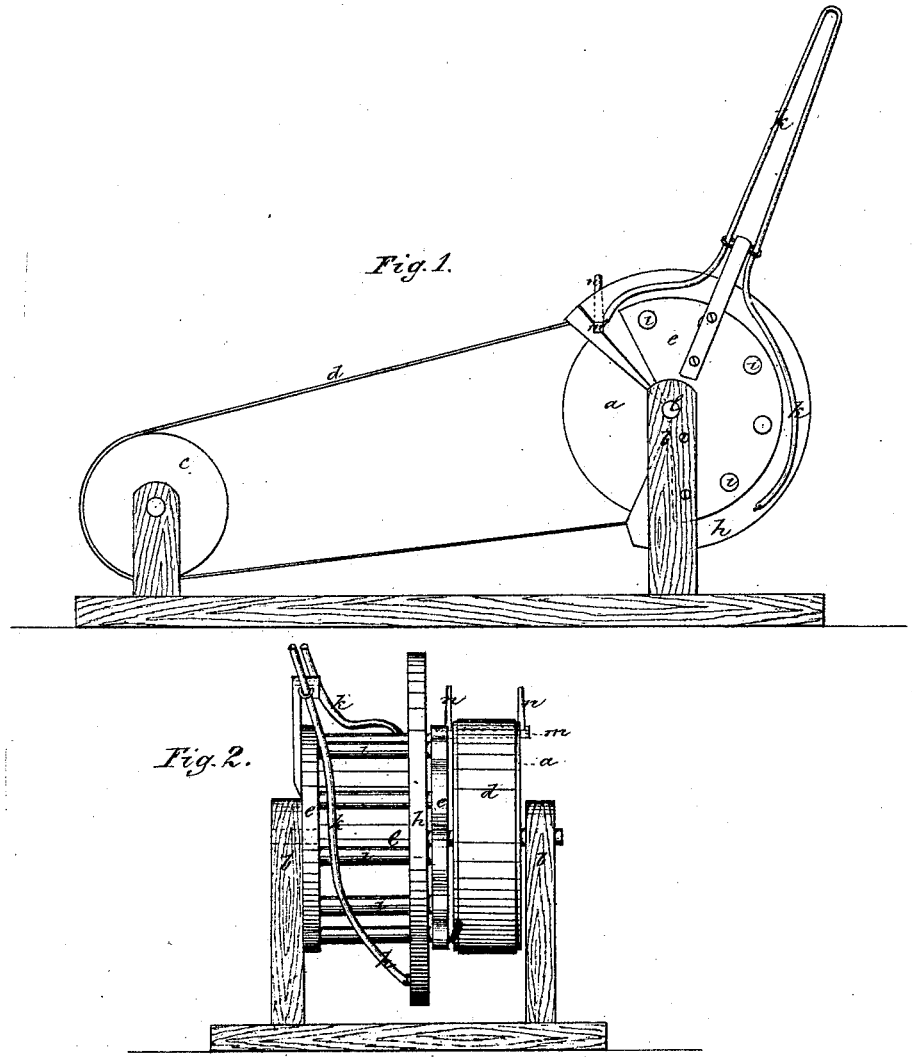

JOSEPH E. MUTCHLER, OF GRAND RAPIDS, MICHIGAN

Letters Patent No. 108,379, dated October 18, 1870.

IMPROVEMENT IN BELT-SHIFTERS.

The Schedule referred to in these Letters Patent and making part of the same.

I, JOSEPH E. MUTCHLER, of Grand Rapids, Kent county, Michigan, have invented certain Improvements in Belt-Shifters, of which the following is a specification.

Figure 1 is a side, and

Figure 2, an end elevation.

This invention has for its object the shifting of a belt from a wheel in motion to a stationary holder, instead of to a loose pulley, the device usually employed; and It relates to a series of rollers, which are sustained in a curved row between two semicircular plates, in which the journals of the rollers are mounted, said plates and rollers forming together a holder, that is placed by the side of any wheel which bears a belt, upon which the belt may be shifted whenever desired, by means of a mechanism to be hereinafter described.

In the drawing—

$a$ is a belt-bearing motor-wheel, whose shaft is mounted in standards $b$;

$c$ is a wheel driven by the belt $d$, that runs over the main wheel $a$;

$e$ $e$ are the two semicircular plates; and $i$, the rollers mounted in the same, that together form the belt-holder, the latter being sustained in position by the side of the wheel $a$, by securing the outer plate $e$ in any suitable manner to the outer standard $b$.

$h$ is a plate, placed between the plates $e$, and having orifices, through which the rollers $i$ pass, the plate $h$ being made to slide on the rollers, toward or from the wheel $a$, by means of a forked lever, $k$, whose fulcrum is in the post $l$, that is secured to and projects upward from the outer plate $e$, and which is jointed, at the ends of its branches, to points near the corners of the plate $h$.

$m$ is a bar, projecting horizontally past the wheel $a$, from a point near the upper corner of the plate $h$, that brings the bar just below the upper branch of the belt $d$.

$n$ $n$ are guides mounted on pins that extend upward from the bar $m$, one at each end of the belt $d$.

On throwing the upper part of the lever $k$ toward the pulley $a$, the forks of the lever draw the plate $h$, bar $m$, and guides $n$, and, by means of said bar and guides, the belt $d$ also, away from the wheel $a$, shifting the belt upon the roller $i$.

As the arc in which said rollers are placed is of less radius than the wheel $a$, the belt is loosened when it is drawn upon the rollers, and is, consequently, permitted to gather itself together, preparatory to fresh tension, no loose pulley being necessary, and the belt remains idle, subject to no wear, tear, or strain, and the power necessary to drive the loose pulley is saved.

Friction-rollers are mounted in the side of the plate $h$ that is nearest the belt $d$, in order to meet the edge of the latter.

Claim.

The belt-holder, consisting of the plates $e$ and rollers $i$, arranged in connection with the shifting mechanism, consisting of the plate $h$, lever $k$, bar $m$, and guides $n$, as described.

JOSEPH E. MUTCHLER.

Witnesses:
L. R. ATWATER,
GEO. H. TUTTLE.